US012423978B2

(12) United States Patent
Laaksonen et al.

(10) Patent No.: US 12,423,978 B2
(45) Date of Patent: Sep. 23, 2025

(54) IMAGE PROCESSING

(71) Applicant: Nokia Technologies Oy, Espoo (FI)

(72) Inventors: Lasse Juhani Laaksonen, Tampere (FI); Arto Juhani Lehtiniemi, Lempaala (FI); Miikka Tapani Vilermo, Siuro (FI)

(73) Assignee: Nokia Technologies Oy, Espoo (FI)

(*) Notice: Subject to any disclaimer, the term of this patent is extended or adjusted under 35 U.S.C. 154(b) by 629 days.

(21) Appl. No.: 17/732,762

(22) Filed: Apr. 29, 2022

(65) Prior Publication Data
US 2022/0358763 A1    Nov. 10, 2022

(30) Foreign Application Priority Data

May 7, 2021  (EP) .................................... 21172794

(51) Int. Cl.
*G06V 20/40*   (2022.01)
*G06T 5/50*    (2006.01)
*H04N 19/51*   (2014.01)

(52) U.S. Cl.
CPC ............... *G06V 20/47* (2022.01); *G06T 5/50* (2013.01); *H04N 19/51* (2014.11)

(58) Field of Classification Search
CPC ........... G06T 11/60; G06T 2207/10016; G06T 2207/20104; G06T 5/50; G06T 5/77; G06V 20/47; H04N 19/51

See application file for complete search history.

(56) References Cited

U.S. PATENT DOCUMENTS

| | | | | |
|---|---|---|---|---|
| 2013/0314511 | A1* | 11/2013 | Chen | H04N 23/682 |
| | | | | 348/208.99 |
| 2020/0394828 | A1* | 12/2020 | Shukla | G06F 3/0482 |
| 2021/0019453 | A1* | 1/2021 | Yang | G06N 5/01 |
| 2022/0138913 | A1* | 5/2022 | Huang | G06V 10/62 |
| | | | | 348/241 |
| 2022/0156893 | A1* | 5/2022 | Zhou | G06T 5/50 |
| 2022/0237750 | A1* | 7/2022 | Pan | G11B 27/036 |
| 2022/0301118 | A1* | 9/2022 | Frey | G06T 5/77 |
| 2022/0366590 | A1* | 11/2022 | Satat | G06T 5/77 |

FOREIGN PATENT DOCUMENTS

| | | | | |
|---|---|---|---|---|
| CN | 104376545 A | * | 2/2015 | G06T 5/008 |
| WO | WO-2011053374 A1 | * | 5/2011 | G06T 5/005 |
| WO | WO-2021230863 A1 | * | 11/2021 | G06N 20/00 |

* cited by examiner

*Primary Examiner* — Nizar N Sivji
(74) *Attorney, Agent, or Firm* — McCarter & English, LLP

(57) ABSTRACT

An apparatus and method for image processing is disclosed. The method may include receiving an image from a camera sensor, receiving selection of one or more target objects appearing in the image and tracking the one or more target objects over a plurality of subsequently-received images. For the subsequently-received images in turn, the method may include estimating one or more performance metric(s) associated with performing a fill-in processing operation of the one or more tracked target objects and saving the image as an optimised reference image if the respective performance metric(s) indicate an improved performance over that of one or more previously-received images from the time of receiving selection. The method may include performing the fill-in processing operation using one or more of the saved optimised reference images for output to a display screen.

20 Claims, 7 Drawing Sheets

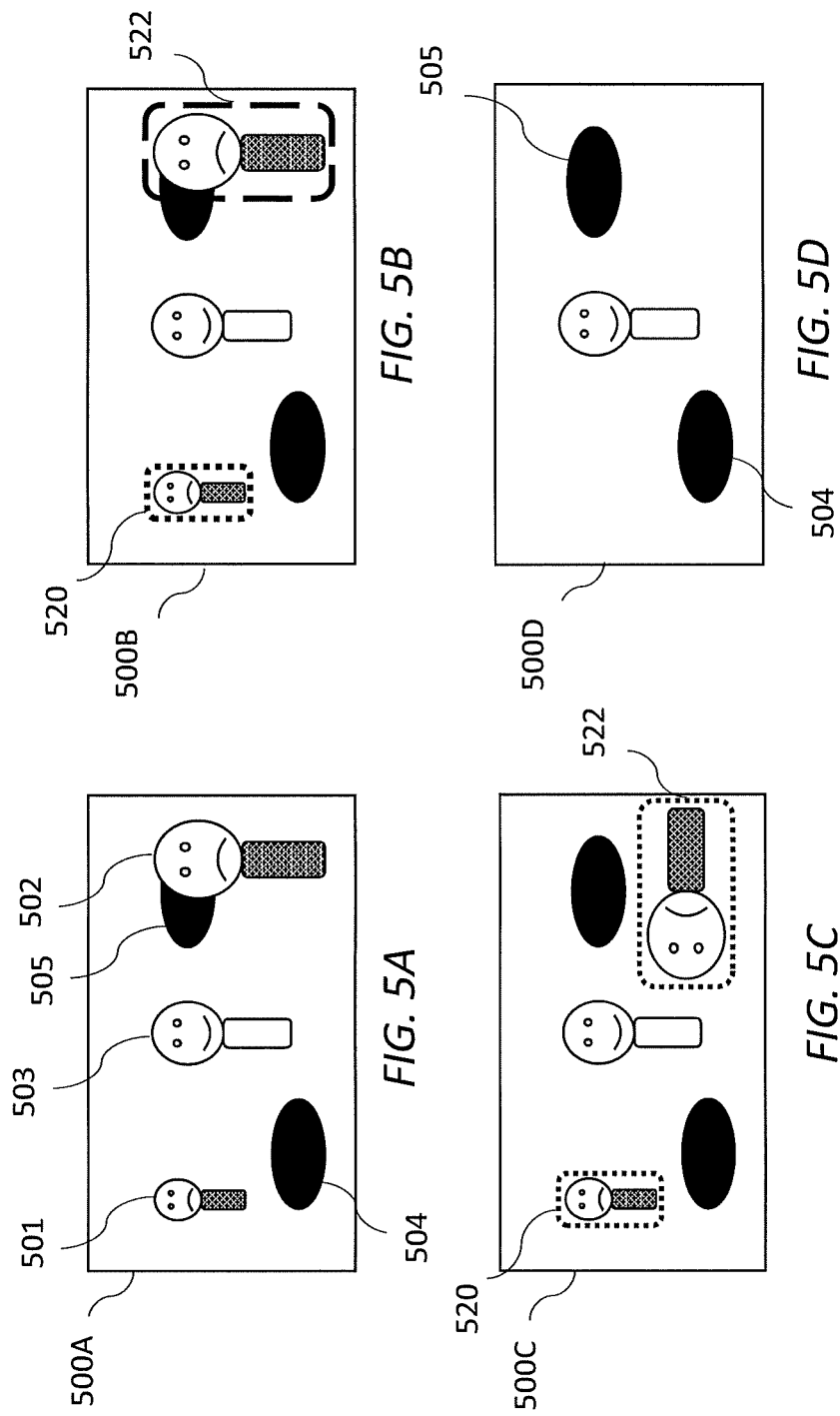

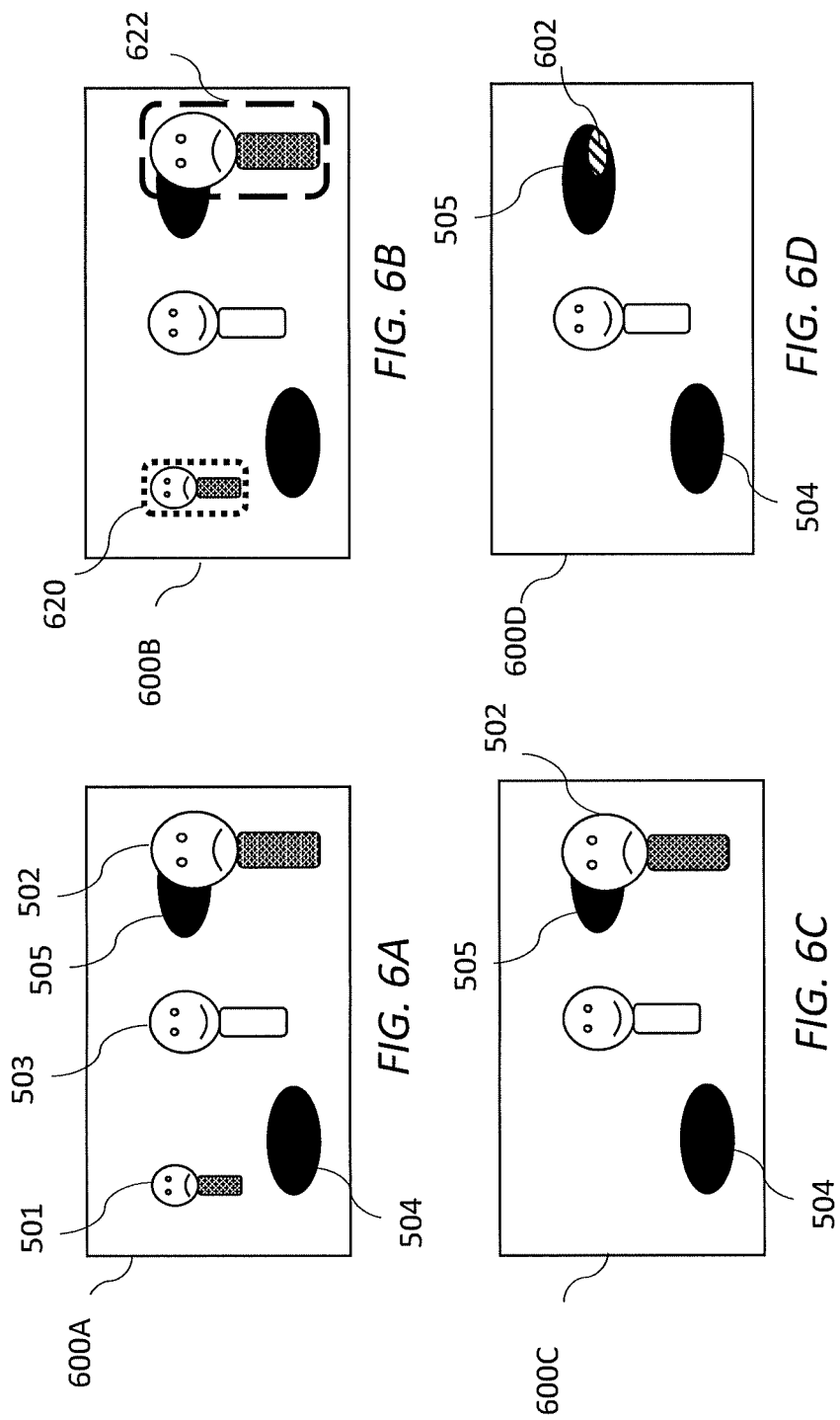

IMAGE PROCESSING

FIELD

Example embodiments relate to image processing in which one or more unwanted objects appearing in an image may be replaced with other image content.

BACKGROUND

In digital photography, a camera user may wish to capture a photograph of a scene in which one or more unwanted objects may be present. For example, a user may wish to capture a photograph of a landscape but finds that a person is blocking part of the landscape. Through image processing techniques, it is possible to select one or more unwanted objects appearing in one or more images and have that or those one or more objects "filled-in" to be replaced by other image content. The aim may be to produce a photograph that comprises substantially none of the unwanted objects and which appears natural in terms of consistency with the remainder of the scene.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: receiving an image from a camera sensor; receiving selection of one or more target objects appearing in the image; tracking the one or more target objects over a plurality of subsequently-received images; for the subsequently-received images in turn: estimating one or more performance metric(s) associated with performing a fill-in processing operation of the one or more tracked target objects; saving the image as an optimised reference image in the event that the respective performance metric(s) indicate an improved performance over that of one or more previously-received images from the time of receiving selection; and performing the fill-in processing operation using one or more of the saved optimised reference images for output to a display screen.

The means for performing the fill-in processing operation may be configured to perform said operation for each of the one or more optimised reference images, at the time of saving said one or more optimised reference images, for real-time output of the processed optimised reference images to a display screen.

The means for performing the fill-in processing operation may be configured to perform said operation in respect of only the last-saved optimised reference image based on a capture time.

The capture time may correspond to a time at which the performance metric(s) for the last-saved optimised reference image meet a predetermined criterion or criteria.

The capture time may correspond to the end of a predetermined expiry period from when the one or more target objects were selected.

The capture time may correspond to receipt of a capture input from a user.

The apparatus may further comprise means for: estimating, using an image received at the capture time, the one or more performance metric(s) associated with performing the fill-in processing operation; and determining that said performance metric(s) indicate degraded performance relative to the last-saved optimised reference image; wherein the means for performing the fill-in processing operation is configured to perform the fill-in operation in respect of the image received at the capture time and the last-saved optimised reference image for preview of both processed images.

The apparatus may further comprise means for indicating in real-time, via a user interface, the one or more respective performance metric(s) for a currently-displayed one of the subsequently-received images.

The indicating means may be configured to indicate in real-time when the one or more performance metric(s) for the last-saved optimised reference image meet a predetermined criterion or criteria.

The selection means may be configured to receive selection of a plurality of target objects; the estimating means may be configured to estimate the one or more performance metric(s) for each of the target objects; and the indicating means may be configured to indicate the respective performance metric(s) for each of the target objects.

The indicating means may be configured to indicate in real-time a first set of one or more target objects for which the respective performance metric(s) meets a predetermined criterion or criteria and a second set of one or more target objects for which the respective performance metric(s) do not meet the predetermined criterion or criteria.

The apparatus may further comprise means for: determining that the respective performance metric(s) for the second set of one or more target objects does not indicate an improved performance over a predetermined time period; responsive to the determination, providing to the user options of: performing the fill-in processing operation in respect of only the first set of one or more target objects; or performing the fill-in operation in respect of the first and second sets of one or more target objects; and performing the fill-in processing operation based on user selection of one of the user options.

The one or more performance metric(s) may comprise a value based on one or more of:
- the size of the one or more target objects;
- the size of a part of the one or more target objects estimated as difficult to fill-in;
- the shape of the one or more target objects;
- the position within a frame of the one or more target objects;
- the complexity of one or more background regions outside of the one or more target objects;
- an estimated accuracy of segmenting the one or more target objects responsive to the user selection.

The apparatus may comprise a mobile handset or digital camera.

According to a second aspect, there is described a method comprising: receiving an image from a camera sensor; receiving selection of one or more target objects appearing in the image; tracking the one or more target objects over a plurality of subsequently-received images; for the subsequently-received images in turn: estimating one or more performance metric(s) associated with performing a fill-in processing operation of the one or more tracked target objects; saving the image as an optimised reference image if the respective performance metric(s) indicate an improved performance over that of one or more previously-received images from the time of receiving selection; and performing the fill-in processing operation using one or more of the saved optimised reference images for output to a display screen.

Performing the fill-in processing operation may comprise performing said operation for each of the one or more optimised reference images, at the time of saving said one or more optimised reference images, for real-time output of the processed optimised reference images to a display screen.

Performing the fill-in processing operation may comprise performing said operation in respect of only the last-saved optimised reference image based on a capture time.

The capture time may correspond to a time at which the performance metric(s) for the last-saved optimised reference image meet a predetermined criterion or criteria.

The capture time may correspond to the end of a predetermined expiry period from when the one or more target objects were selected.

The capture time may correspond to receipt of a capture input from a user.

The method may further comprise: estimating, using an image received at the capture time, the one or more performance metric(s) associated with performing the fill-in processing operation; and determining that said performance metric(s) indicate degraded performance relative to the last-saved optimised reference image; wherein the means for performing the fill-in processing operation is configured to perform the fill-in operation in respect of the image received at the capture time and the last-saved optimised reference image for preview of both processed images.

The method may comprise indicating in real-time, via a user interface, the one or more respective performance metric(s) for a currently-displayed one of the subsequently-received images.

The indicating may comprise indicating in real-time when the one or more performance metric(s) for the last-saved optimised reference image meet a predetermined criterion or criteria.

Selection may comprise receiving selection of a plurality of target objects; the estimating may comprise estimating the one or more performance metric(s) for each of the target objects; and the indicating may comprise indicating the respective performance metric(s) for each of the target objects.

The indicating may comprise indicating in real-time a first set of one or more target objects for which the respective performance metric(s) meets a predetermined criterion or criteria and a second set of one or more target objects for which the respective performance metric(s) do not meet the predetermined criterion or criteria.

The method may further comprise determining that the respective performance metric(s) for the second set of one or more target objects does not indicate an improved performance over a predetermined time period; responsive to the determination, providing to the user options of: performing the fill-in processing operation in respect of only the first set of one or more target objects; or performing the fill-in operation in respect of the first and second sets of one or more target objects; and performing the fill-in processing operation based on user selection of one of the user options.

The one or more performance metric(s) may comprise a value based on one or more of:
the size of the one or more target objects;
the size of a part of the one or more target objects estimated as difficult to fill-in;
the shape of the one or more target objects;
the position within a frame of the one or more target objects;
the complexity of one or more background regions outside of the one or more target objects;
an estimated accuracy of segmenting the one or more target objects responsive to the user selection.

The method may be performed at an apparatus which may comprise a mobile handset or digital camera.

According to a third aspect, there is provided a computer program product comprising a set of instructions which, when executed on an apparatus, is configured to cause the apparatus to carry out the method of any preceding method definition.

According to a fourth aspect, there is provided a non-transitory computer readable medium comprising program instructions stored thereon for performing a method, comprising: receiving an image from a camera sensor; receiving selection of one or more target objects appearing in the image; tracking the one or more target objects over a plurality of subsequently-received images; for the subsequently-received images in turn: estimating one or more performance metric(s) associated with performing a fill-in processing operation of the one or more tracked target objects; saving the image as an optimised reference image if the respective performance metric(s) indicate an improved performance over that of one or more previously-received images from the time of receiving selection; and performing the fill-in processing operation using one or more of the saved optimised reference images for output to a display screen.

The program instructions of the fourth aspect may also perform operations according to any preceding method definition of the second aspect.

According to a fifth aspect, there is provided an apparatus comprising: at least one processor; and at least one memory including computer program code which, when executed by the at least one processor, causes the apparatus to: receive an image from a camera sensor; receive selection of one or more target objects appearing in the image; track the one or more target objects over a plurality of subsequently-received images; for the subsequently-received images in turn: estimate one or more performance metric(s) associated with performing a fill-in processing operation of the one or more tracked target objects; save the image as an optimised reference image if the respective performance metric(s) indicate an improved performance over that of one or more previously-received images from the time of receiving selection; and perform the fill-in processing operation using one or more of the saved optimised reference images for output to a display screen.

The computer program code of the fifth aspect may also perform operations according to any preceding method definition of the second aspect.

BRIEF DESCRIPTION OF THE DRAWINGS

Example embodiments will now be described by way of non-limiting example, with reference to the accompanying drawings, in which:

FIGS. 5A-5D respectively show images that may be displayed on a display screen of the FIG. 2 camera apparatus according to one or more example embodiments;

FIGS. 6A-6D respectively show images that may be displayed on the display screen of the FIG. 2 camera apparatus according to one or more other example embodiments;

DETAILED DESCRIPTION

Figure 1A:
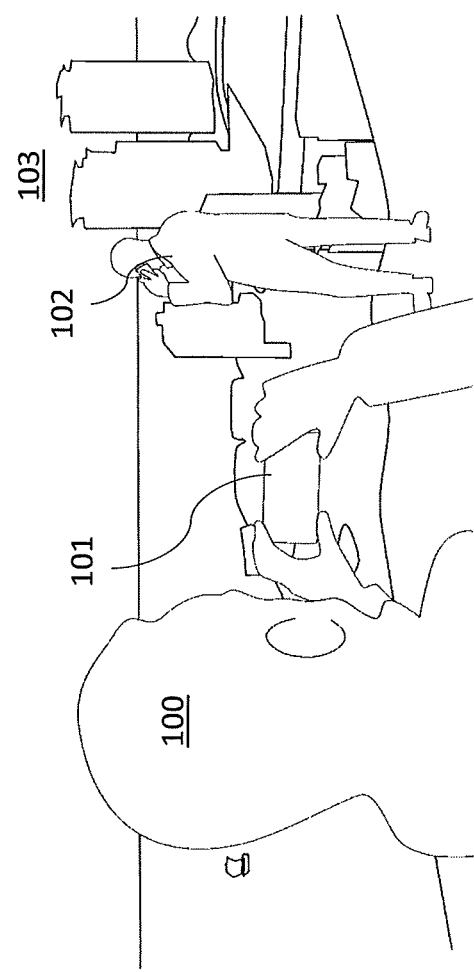
FIG. 1A is a view of a user taking a photograph of a scene which is partially blocked by a person.

Example embodiments relate to image processing, for example so-called "fill-in" image processing in which one or more unwanted objects appearing in an image may be replaced with other image content.

Example embodiments may relate to fill-in image processing performed in the course of using a camera apparatus to process one or more images which may be received as part of a live feed of images from a camera sensor of the camera apparatus.

When preparing to take a photograph, a user may want to remove one or more unwanted objects from received images. This operation may comprise a user selecting one or more unwanted objects in at least a first image, which may be a captured (i.e. saved or stored) image or a live viewfinder image shown on a display screen of the camera apparatus. User selection may be made via a highlighting operation or another indicating method to identify one or more regions of pixels which may represent the one or more unwanted objects. Following selection, a fill-in image processing operation may be performed to remove the one or more unwanted objects from subsequently-received images and automatically fill-in the resulting "hole" with computationally-generated samples which may come from other parts of the image.

The fill-in processing operation may use any suitable image processing algorithm to replace the hole, for example by re-arranging or connecting patches of pixels derived from other parts of the image, which other parts may be referred to as source or background parts of the image. For example, use of nearest-neighbour pixel values and/or other such methods may be used. So-called Content-Aware Fill (CAF) is a known fill-in processing algorithm, although there are other examples.

The result of performing the fill-in processing operation may result in the hole being filled-in such that the unwanted objects appear as if they were never there and replaced with content that appears to merge or blend with what would be expected in the background.

In the context of using a camera apparatus which receives and displays a sequence of live images, it may be useful for a user to see via a display screen the output of the fill-in image processing prior to initiating capture of an image. By "capture" is meant storing the image on memory. However, this may be computationally very expensive if performed for all received images and may also deplete a battery of the camera apparatus. Also, the timing of capture may be sub-optimal. For example, the time taken to perform the fill-in processing operation may mean that the scene will change by the time the user selects to capture the image. Hence, the captured and processed image may actually appear very different from that indicated via the display screen. For example, if the scene suddenly becomes more complex, the captured and processed image may contain unwanted artefacts.

Example embodiments may involve considerations as to the timing of when to capture an image for one or more of reducing the computational burden, increasing battery life and obtaining a more optimal processing result containing fewer or no unwanted artefacts.

Figure 1B:
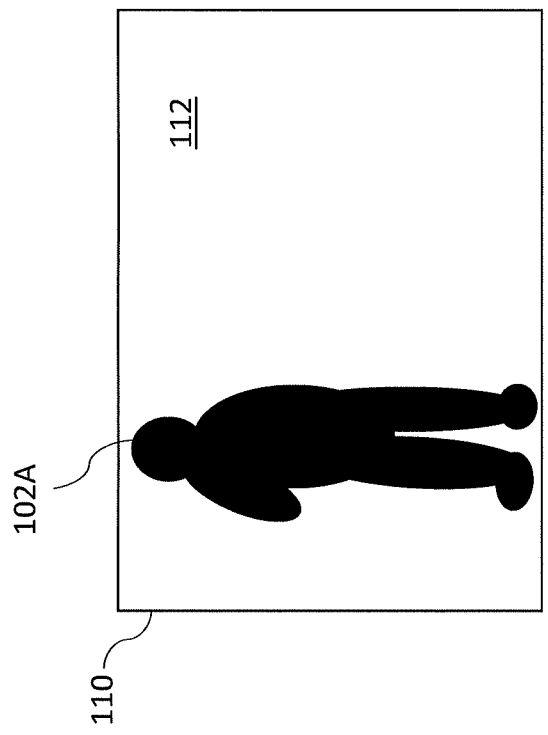
FIG. 1B is a mask image indicating a segmented outline of the person shown in FIG. 1A.

FIG. 1A, for example, shows a user 100 in the course of taking a photograph using a camera apparatus 101. An unwanted object, in this case a person 102, appears between the user and part of a wanted scene 103. FIG. 1B shows a mask image 110 indicating a blob 102A which represents the segmented outline of the person 102 following selection by the user 100. One or more conventional image segmentation methods may be used to estimate the outline of the person 102 based on, for example, pixel values. From this, the blob 102A can be identified and also tracked in subsequent images using known methods. Fill-in processing operations may employ pixel values from one or more source regions 112 outside of the blob 102A for use in the replacing pixels of the image corresponding to the blob 102A or at least part thereof.

As used herein, an unwanted object may be referred to as a target object. A target object may comprise an identifiable group or blob of pixels representing the unwanted object.

One or more target objects may be manually identified by a user.

For example, a user may identify, via a pointer or touch inputs to a touch screen, one or more target objects appearing in an image on a display screen of an apparatus, such as a camera apparatus which may be provided in any suitable form. The image may be an already-captured image, i.e. saved on memory, or a live image.

Alternatively, or additionally, one or more target objects may be automatically identified based on some prior indication of one or more types or properties of objects to identify as target objects. For example, a user who is primarily interested in taking photographs of landscapes may give a prior indication that objects which correspond to people are to be selected as target objects. Such prior indications may be made in a settings or a configurations option within software according to example embodiments. In some embodiments, an allowed list of wanted objects may be provided and/or a disallowed list of target objects may be provided.

Figure 2:
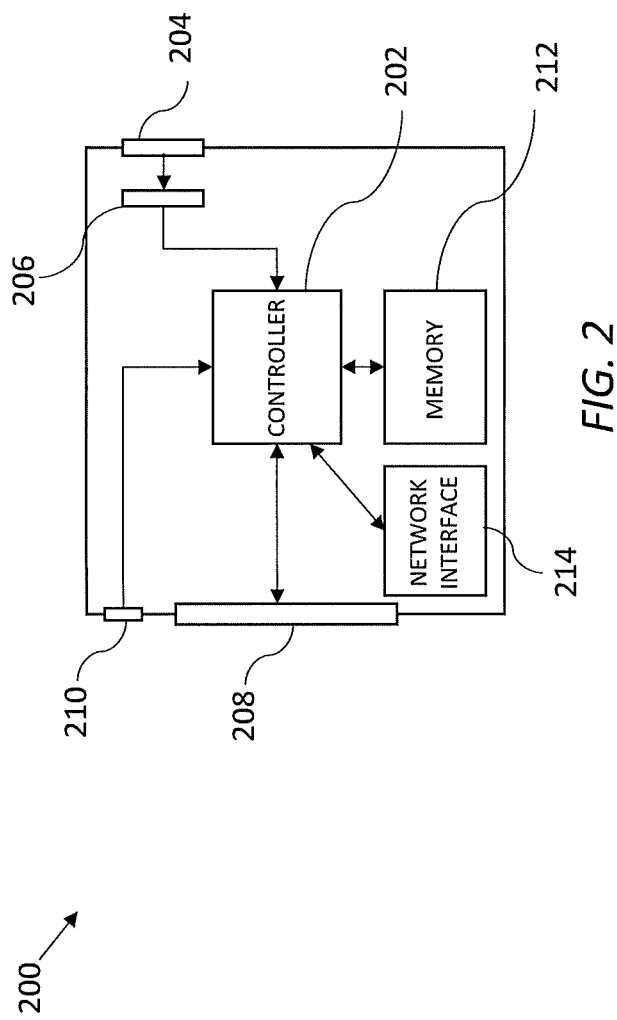
FIG. 2 is a schematic block diagram of a camera apparatus which may be configured to operate according to one or more example embodiments.

FIG. 2 is a block diagram of an example camera apparatus 200 according to some example embodiments. A more detailed description of an apparatus according to example embodiments will be given later on with reference to FIG. 7.

The camera apparatus 200 may comprise a controller 202, e.g. one or more processors, a lens 204, a camera sensor 206, a display screen 208, a capture button 210, a memory 212 and a network interface 214.

The controller 202 may be configured to perform processing operations to be described below, for example in association with software and/or firmware.

The camera sensor 206 may be of any suitable type, such as, but not limited to, a charge-coupled device (CCD) or active-pixel type sensor. An image (or frame) may comprise a grid of pixels, the resolution of which is determined by the characteristics of the camera sensor 206. A live feed of images may be received by the controller 202 based on the refresh rate of the camera sensor 206, which may vary between different camera sensor manufacturers.

The camera apparatus 200 may comprise, but is not limited to, a mobile handset, e.g. a smartphone, a digital camera, a tablet computer, a laptop, a personal computer, a digital assistant, a smartwatch and so on.

The display screen 208, which may or may not comprise a touchscreen for making inputs, may act as a viewfinder for displaying in real-time the live feed of images being received by the camera sensor 206. The display screen 208 may also show other options via a menu screen, for example to bring-up captured images that are stored on the memory 212.

The capture button 210 may comprise a hard or soft input button for causing the controller 202 to perform manual capture of an image, which may be processed in accordance with operations described below. In some embodiments, capture of an image may be automatic and therefore will not require user input via the capture button 210. In some embodiments, the capture button 210 may be a soft input button provided on the display screen 208, if a touchscreen. In some embodiments, the capture button 210 may not be needed, and capture may be initiated by a voice or gesture input.

The memory 212 may store software and/or firmware for performance of example embodiment operations to be described below. The memory 212, or a different memory, may be used to store captured and/or processed images. The camera apparatus 200 may comprise a removable media slot (not shown) such as a memory card slot in order that captured and/or processed images may be stored on a removable media.

In some example embodiments, at least some processing may be performed external to the camera apparatus 200. For this purpose, the camera apparatus 200 may comprise the network interface 214 for wired or wireless communications with an external processing system which can be of any suitable form. For example, the network interface 214 may comprise one or more of a cellular such as 5G, Bluetooth, Zigbee and WiFi interface, e.g. using the IEEE 802.11 communications standard. The network interface 214 may also be used to send and/or receive captured images to and/or from remote storage, e.g. a cloud repository.

Figure 3:
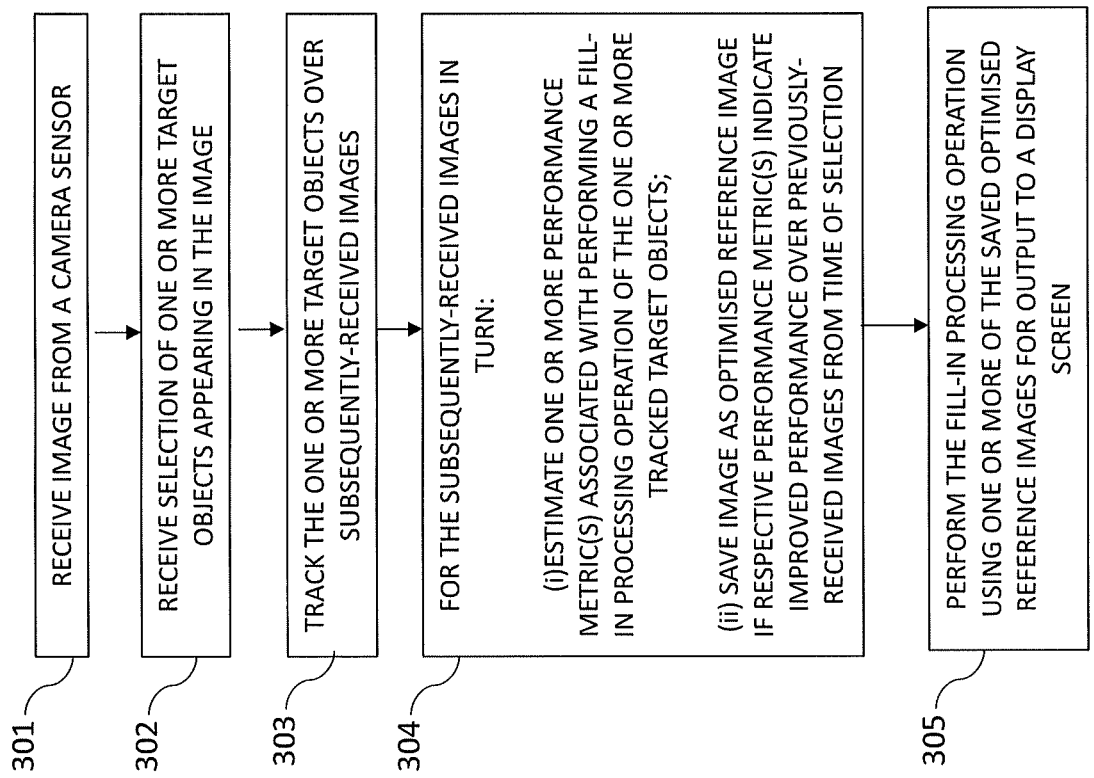
FIG. 3 is a flow diagram indicating processing operations according to one or more example embodiments.

Referring to FIG. 3 a flow diagram is shown indicating processing operations that may be performed by the camera apparatus 200 according to one or more example embodiments. The processing operations may be performed by hardware, software, firmware or a combination thereof. The shown order is not necessarily indicative of the order of processing.

A first operation 301 may comprise receiving an image from a camera sensor.

A second operation 302 may comprise receiving selection of one or more target objects appearing in the image.

A third operation 303 may comprise tracking the one or more target objects over a plurality of subsequently-received images.

A fourth operation 304 may comprise, for the subsequently-received images in turn:
(i) estimating one or more performance metrics associated with performing a fill-in processing operation of the one or more tracked target objects; and
(ii) saving the image as an optimised reference image if the respective one or more performance metrics indicate an improved performance over that of previously-received image(s) from the time of receiving selection.

The term "saving" may mean storing the image on some form of memory, which may or may not be a cache memory, for performance of fill-in processing. The image may be stored temporarily for this purpose.

A fifth operation 305 may comprise performing the fill-in processing operation using one or more of the saved optimised reference images for output to a display screen.

In respect of the first operation 301, the image may be received in any suitable format, e.g. using one or more of a Joint Photograph Experts Group (JPEG), High Efficient Image File (HEIF), RAW or Bitmap (BMP) image format, to name but some. The image may comprise one of a stream or a live feed of images from the camera sensor 206.

In respect of the second operation 302, receiving selection of one or more target objects may utilise any suitable selection method, such as by manual selection via inputs made via the display screen 208 in respect of a currently-displayed image. As mentioned above, however, one or more target objects may be automatically identified based on some prior indication of one or more types or properties of objects to identify as target objects.

In some embodiments, selection of a target object by a user may automatically result in all other objects (e.g. people) of the same type being selected. In some example embodiments, receiving selection of one or more target objects may be performed indirectly, for example by a user selecting one or more objects that they wish to remain in the image and in which all other objects may be considered target objects.

The selection may result in segmentation and tracking of the one or more target objects using conventional techniques.

In respect of the fourth operation 304, the one or more performance metrics may comprise a value based on any one or more parameters known to affect or influence fill-in processing performance. For example, the fill-in processing performance may refer to, or be indicative of, the amount of processing time and/or power required to perform the fill-in processing operation and/or indicative of the difficulty involved in performing the fill-in processing operation for one or more selected target objects. The one or more performance metrics may comprise a value, e.g. a numerical value, which, if decreasing relative to a previous value, may indicate an improvement in fill-in processing performance, such as by indicating less processing time and/or power required for performing the fill-in processing operation for the one or more selected target objects. An increasing metric value may indicate degradation in fill-in processing performance. In an alternative implementation, an increasing metric value may indicate an improvement in fill-in processing performance and a decreasing metric value may indicate a degradation in fill-in processing performance.

For example, the one or more performance metric(s) may comprise a value based on one or more of:
the size of the one or more target objects;
the size of a part of the one or more target objects estimated as difficult to fill-in, which may be due to the complexity of the content being blocked;
the shape of the one or more target objects;
the position within a frame of the one or more target objects;
the complexity of one or more background or source regions outside of the one or more target objects; and
an estimated accuracy of segmenting the one or more target objects responsive to the user selection.

Regarding size, for example, the smaller the blob area of the one or more target objects, the less processing is likely to be required in performance of the fill-in processing operation for the one or more target objects.

Regarding shape, for example, the more complicated the one or more target objects in terms of outline, the longer (and more processing power) it will likely take the fill-in processing algorithm to produce an end result compared with, for example, a basic polygon shape.

Regarding complexity of one or more background regions outside of the one or more target objects, it will be appreciated that the higher the variance or spatial frequency of pixels in the background region, the longer (and more processing power) it will likely take the fill-in processing algorithm to produce an end result compared with, for example, a more uniform or slowly-changing background region, e.g. sky.

Regarding estimated accuracy of segmenting the one or more target objects responsive to the user selection, it will be appreciated that some types of tracked target object will be harder to segment and therefore track than others. For example, a target object representing a person with long hair that moves in the wind will likely be harder to segment and track than a target object representing a person with shorter hair.

It will be appreciated, therefore, that the one or more performance metrics may comprise a value (e.g. number) based on one or a combination of the above examples. A decreasing metric value may indicate an improvement and an increasing metric value may indicate degraded performance or, in an alternative implementation, an increasing metric value may indicate an improvement and the decreasing metric value may indicate degraded performance.

Saving the image as an optimised reference image if the respective one or more performance metrics indicate an improved performance over that of previously-received images means that images will only be saved if said metrics indicate an improved performance. As time goes on, the last-saved image may therefore represent an optimised image in terms of estimated fill-in processing performance. Accordingly, not all images of a live feed of images received from a camera sensor, e.g. the camera sensor 206 of the FIG. 2 camera apparatus 200, need be saved for subsequent fill-in processing during the course of the user using the camera apparatus. Fill-in processing may therefore be performed in a more optimised way based on a more limited number of images than on all images received by the camera sensor 206.

In saving an image as an optimised reference image, a previous instance of a saved optimised reference image may be deleted because the newly-saved image is estimated as more optimal.

In respect of the fifth, fill-in processing operation 305, this may be performed at a particular time and presented to the user via, for example, the display screen 208.

For example, the fill-in processing operation 305 may be performed for each of the one or more optimised reference images, substantially at the time of saving said one or more optimised reference images, for real-time output of the processed optimised reference images to a display such as the display screen 208.

In this way, whenever an improved performance metric is determined, the display screen 208 may show the user the result of the fill-in processing operation in order that they may preview and, if they wish, capture the resulting image for storage on the memory 212. Alternatively, the user may wish to continue moving the camera or await movement in the scene to see if the performance metric improves further.

For example, the fill-in processing operation 305 may be performed in respect of only the last-saved optimised reference image based on a capture time.

The capture time may correspond to a time at which the performance metric(s) for the last-saved optimised reference image meet a predetermined criterion (or criteria). The criterion may represent an optimised condition.

For example, the predetermined criterion may be when the one or more performance metrics cross a predetermined threshold, which may be a numerical value. Where a combination of performance metrics are considered, the predetermined criterion may comprise a set of rules based on a combination of metrics, examples of which have been given above, e.g. when a size metric is below value X and a shape metric is below value Y.

For example, if the one or more performance metrics range from values of one-hundred (very difficult to perform fill-in processing) to zero (very easy to perform fill-in processing) then the predetermined threshold may comprise a value of zero or a value close to zero, e.g. ten. Upon reaching this value, fill-in processing may be performed automatically on the last-saved optimised reference image and the result displayed.

For example, the capture time may correspond to the end of a predetermined expiry period from when the one or more target objects were selected. Thus, in this case, upon selecting the one or more target objects, or otherwise entering a fill-in mode of operation, a timer may commence. Upon expiry of the timer, e.g. after ten seconds, fill-in processing may be performed on the last-saved optimised reference image and the result displayed. The result may be displayed as a preview image on the display screen 208 which the user may confirm for capture by means of using the capture button 210, or alternatively the user may select not to capture the preview image so that the image is not stored on the memory. Alternatively still, the result may be automatically captured and the image to which the fill-in processing has been performed may be stored on the memory 212.

For example, the capture time may correspond to receipt of a capture input from a user. That is, when a user provides a capture input, such as through the capture button 210, fill-in processing may be performed on the last-saved optimised reference image and the result displayed. If the user wishes to keep the last-saved optimised reference image, with fill-in processing applied, the user may indicate as such and the image may be stored on the memory 212.

In another example, at the time of manual capture input, the one or more performance metrics may be determined for the image received at the capture time. Notwithstanding that said one or more performance metrics may indicate a degraded performance relative to the last-saved optimised reference image, fill-in processing operations may be performed both for the image received at the capture time and the last saved optimised reference image. Both processed images may be shown as preview images, simultaneously or sequentially, via the display screen 208 in order that the user can select one of said processed images to keep as the captured image for storage on the memory 212. The other image may be deleted from the memory 212.

Figure 4:
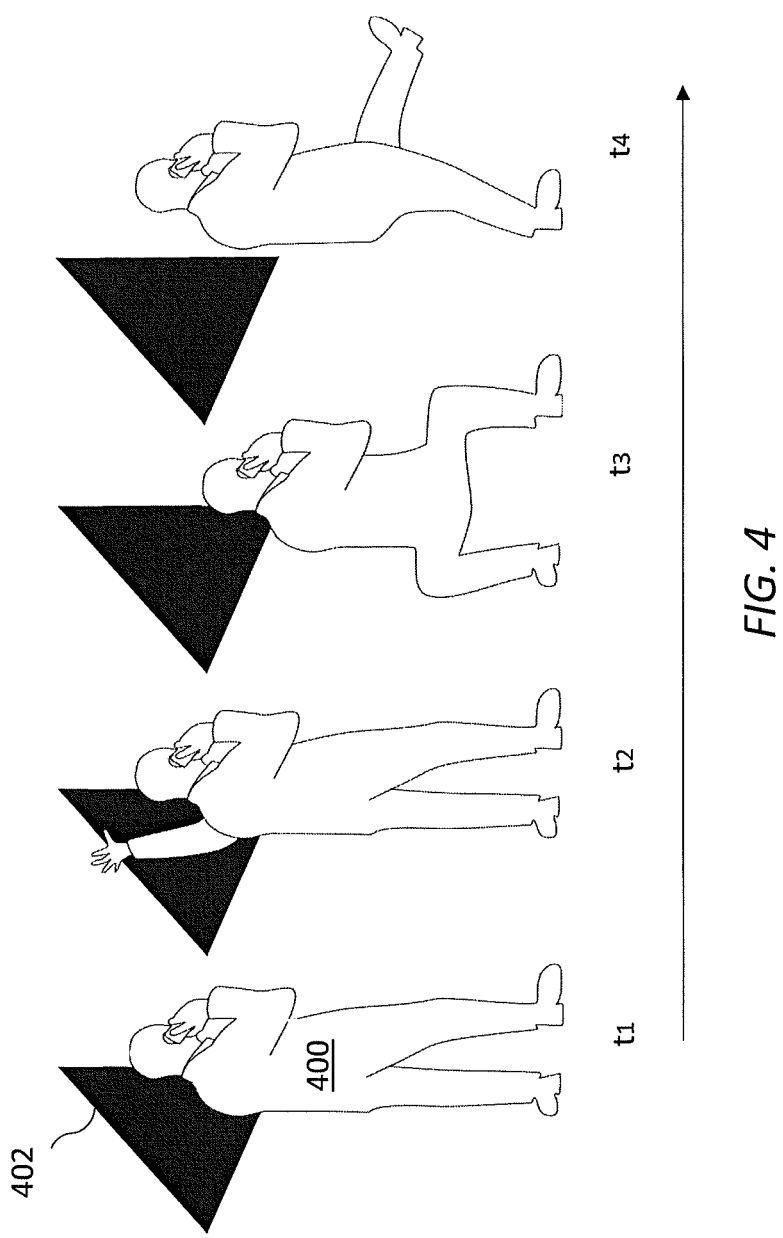
FIG. 4 is a representational view of a scene sequence comprising a person standing in front of content at different times.

For illustration, FIG. 4 shows a scene comprising a target object 400 in the form of a person standing in front of a background which includes complex content 402 that the user wishes to retain in the photograph. The scene is shown over four time instances t1-t4 which may correspond to a sequence of images received from the camera sensor 206 of the camera apparatus 200. It may be assumed that the user has selected the target object 400 using any method mentioned above. It may also be assumed that the target object 400 has been segmented and is tracked across the four time instances t1-t4.

At the first time instance, t1, the target object 400 partially blocks the complex content 402. The one or more performance metrics may be based on, for example, the size of the target object 400 and/or the complexity of the complex content 402. At this time instance, t1, the performance metric may be relatively high and indicative of relatively high difficulty in performing fill-in processing. If the one or more performance metrics are nevertheless the current 'optimum' or 'best' performance metrics, the image at the first time instance, t1, may be saved as an initial optimised reference image.

At the second time instance, t2, the tracked target object 400 increases in size and still partially blocks the complex content 402. The one or more performance metrics may indicate a degradation in fill-in processing performance and hence the image at the second time instance, t2, may not be saved.

At the third time instance, t3, the tracked target object 400 decreases in size and still partially blocks the complex content 402 but to a lesser extent. The one or more performance metrics may indicate an improvement in fill-in processing performance compared with the initial optimised reference image (at the first time instance, t1) and hence the image at the third time instance, t3, may be saved. The image saved at the first time instance, t1, may or may not be removed from memory at this time.

At the fourth time instance, t4, the tracked target object 400 increases in size but no longer blocks any of the complex content 402. The one or more performance metrics may indicate an improvement in fill-in processing performance compared with the second optimised reference image (at the third time instance, t3) and hence the image at the fourth time instance, t4, may be saved as the third optimised reference image. The image saved at the third time instance, t3, may or may not be removed from memory at this time.

It will therefore be appreciated that not all images need be saved. By attempting to optimize over time the one or more performance metrics, with the aim of reducing the estimated processing complexity and/or improving the quality of the fill-in processing output, a more optimal outcome may be achieved in terms of processing performance, increased battery life and/or quality of image output.

As mentioned above, each of the optimised reference images (at the first, third and fourth time instances t1, t3, t4) may be processed using fill-in processing at the approximate time of saving for display to the display screen 208.

Alternatively, only the third optimised reference image at the fourth time instance, t4, may be processed using fill-in processing on the basis that one or more predetermined criterion or criteria are met, e.g. the performance metric is zero or crosses a predetermined threshold close to zero, or a predetermined time period has expired from initiating the fill-in mode.

An improvement is seen over performing fill-in processing for all images received from the camera sensor 206 of the camera apparatus 200. Fill-in processing is performed for only the more optimal image(s) which is likely to reduce or avoid artefacts.

With reference to FIGS. 5 and 6, further embodiments will now be described.

FIGS. 5A-5D respectively show a sequence of images 500A, 500B, 500C, 500D that may be displayed on the display screen 208 of the camera apparatus 200, within a user interface.

FIG. 5A shows a first image 500A which depicts a scene comprising first to fifth objects 501-505. The user of the camera apparatus 200 may select the first and second objects 501, 502 as target objects for removal. The above-described segmentation and tracking operations may then be performed.

Example embodiments may provide a real-time indication of the one or more respective performance metrics for the currently-displayed image. For example, if the one or more performance metrics indicate an improvement over the previously-received images, or meet the above-described predetermined criterion or criteria, then an indicator may signal this to the user.

The indicator may comprise one or more of a graphical, audible and haptic indicator.

Where a plurality of target objects are selected, the one or more performance metrics may be determined for each respective target object and, hence, respective graphical indicators may be used to indicate the individual performance metrics to the user.

Hence, respective graphical indicators may indicate in real-time a first set of one or more target objects for which the respective performance metrics meet a predetermined criterion and a second set of one or more target objects for which the respective performance metrics do not meet the predetermined criterion.

FIG. 5B shows a second image 500B which depicts substantially the same scene, with first and second graphical indicators 520, 522 shown, respectively associated with the first and second target objects 501, 502. In this example, the first and second graphical indicators 520, 522 are provided in the form of bounding boxes, which also indicate the tracking of the first and second target objects 501, 502 across images. Other shapes or style may be used for the first and second graphical indicators 520, 522.

The appearance of the first and second graphical indicators 520, 522 may indicate current values of respective performance metrics for the first and second target objects 501, 502. For example, the first graphical indicator 520 may be shown in a different colour (e.g. green) to that of the second graphical indicator 522 (e.g. colour could be red), or different styles of bounding box (e.g. different styles of broken lines) may be used to show that the performance metric for the first target object 501 has an improved performance metric, or meets the above-described predetermined criterion whereas the second target object 502 has the same or a degraded performance metric, or does not meet the above-described predetermined criterion.

In the shown case, the different appearance of the second graphical indicator 522 may indicate that it will be more difficult to perform the fill-in processing operation for the second target object 502 on the basis of it blocking part of the fifth object 505, which may be relatively complex in terms of appearance. It may be computationally more expensive to compute the fill-in processing algorithm for the second target object 502 and/or may result in artefacts.

As such, the user may make an informed decision as to when to provide a manual capture input based on the collective information provided by the first and second graphical indicators 520, 522.

FIG. 5C shows a third image 500C in which the scene has changed. Specifically, the second target object 502 has moved so that it no longer blocks the fifth object 505. As such, the second graphical indicator 522 has changed its appearance to indicate that the second object 502 has an improved performance metric, or meets the above-described predetermined criterion. This may indicate that it will be less computationally expensive, or easier, to replace. Both the first and second graphical indicators 520, 522 have the same appearance, which may guide the user to initiate a capture input at the current time. When indicating the performance using colours, a colour scale could be used, e.g. green indicating improved performance metric, yellow slightly less improved, and red indicating no improvement in the performance metric. Different shades of the colours could also be used to indicate the level of improved performance metric, e.g. a light green still indicating improved performance metric and a solid green indicating highest level of improved performance metric etc.

As an alternative to using a manual capture input, it will be appreciated that the FIG. 5C condition may result in an automatic capture based on the third image 500C.

In the background, and in accordance with the operations described with reference to FIG. 3, the third image 500C may be saved as an optimised reference image for performance of the fill-in processing operation.

FIG. 5D shows a fourth image 500D in which fill-in processing has been performed, for example in response to receiving a manual capture input or automatic capture decision. It will be seen that the first and second target objects 501, 502 have been removed and the processed image may be displayed to the display screen 208 and/or saved on the memory 212 as a captured image.

As indicated previously, if the manual capture input is received at a slightly-later time, for which the one or more performance metrics for the first and/or second target objects 501, 502 have degraded, the last-saved optimised reference image may be used for fill-in processing, or the option of choosing between the processed current image and the last-saved optimised reference image may be presented to the user for selection.

In some embodiments, as subsequent images are received, it may be determined that the respective performance metrics for at least one of the target objects, or a set of target objects if more are present, do not improve over a predetermined time period or meet the predetermined criterion whereas at least one of the other target objects, or set of target objects, does improve or meet the predetermined criterion.

In response to this determination, the user may be provided selectable options via the display screen 208 of the camera apparatus 200. For example, the selectable options may comprise:
(i) perform the fill-in processing operation only in respect of the one or more target objects for which the respective performance metrics improve or meet the predetermined criterion; or
(ii) perform the fill-in operation in respect of all target objects.

The fill-in processing operation may then be performed based on the user selection.

To illustrate, FIGS. 6A-6D respectively show images 600A, 600B, 600C, 600D that may be displayed on the display screen 208 of the camera apparatus 200, within a user interface.

FIG. 6A shows a first image 600A which depicts a scene comprising the same first to fifth objects 501-505 as shown in FIG. 5A. As before, the user of the camera apparatus 200 may select the first and second objects 501, 502 as target objects for removal. The above-described segmentation and tracking operations may then be performed.

FIG. 6B is similar to FIG. 5B, in that it shows a second image 600B which depicts substantially the same scene, with first and second graphical indicators 620, 622 shown which are respectively associated with the first and second target objects 501, 502.

As noted above, where a plurality of target objects 501, 502 are selected, the one or more performance metrics may be determined for each respective target object, including over subsequent images. So, for example, a first performance metric may be determined and updated for the first target object 501 and a second performance metric may be determined and updated for the second target object 502.

In example embodiments, an image may be saved as an optimised reference image if at least one of the first and second performance metrics respectively associated with the first and second target objects 501, 502 indicate improved performance. That saved image may be associated with the respective first and second target object 501, 502 depending on which performance metric indicated performance improvement. If both performance metrics indicate improvement, then the saved image may be saved in associated with both the first and second target objects 501, 502.

For example, if the first performance metric for the first target object 501 indicates improved performance but the second performance metric for the second target object 502 does not, the current image may be saved as an optimised reference image associated with the first target object 501 and used subsequently if, as in the scenario mentioned below, the second performance metric does not indicate improved performance, e.g. after a predetermined time period. If the second performance metric for the second target object 502 indicates improved performance but the first performance metric for the first target object 501 does not, the current object may be saved as an optimised reference image associated with the second target object 502. Two distinct sets of optimised reference images may be saved based on their respective associations with the first and second target objects 501, 502.

Accordingly, as subsequent images are received, it may be determined that the one or more performance metrics for the second target object 502 do not improve or meet the predetermined criterion whereas that or those for the first target object 501 do. This may be determined over a predetermined time period, e.g. ten seconds from the time of selecting the first and second target objects 501, 502 or from the time the one or more performance metrics for a given one of the first and second target objects indicated an improvement.

Accordingly, the user may be provided via the display screen 208 of the camera apparatus with the options of:
(i) performing the fill-in processing operation only in respect of the first target object sol; or
(ii) performing the fill-in operation in respect of the first and second target objects 501, 502.

The selected fill-in processing operation may be performed using the last-saved optimised reference image associated with, in this example, the first target object 501.

FIG. 6C is a first preview image 600C which indicates the result of performing the fill-in processing operation responsive to user selection of the first option. It will be seen that only the first target object 501 is replaced.

FIG. 6D is a second preview image 600D which indicates the result of performing the fill-in processing operation responsive to user selection of the second option. It will be seen that the first target object 501 is replaced, and some replacement of the second target object 502 has occurred, but leaving an unwanted artefact 602 as reflected by the non-optimal performance metric for the second target object.

In some embodiments, the user may be presented with both the first and second preview images 600C and 600D for confirmation as to which should be saved on the memory 212 as a captured image. In some embodiments, the preview images 600C and 600D may be shown simultaneously on the display screen 208. They may, for example, be shown overlaid in the camera viewfinder image.

Example embodiments have been described for estimating how and when to perform fill-in processing operations in such a way that may reduce the computational burden, increase battery life of a portable camera apparatus and/or obtain a more optimal processing result containing fewer or no unwanted artefacts. In various embodiments, it has been explained that the fill-in processing may be performed on only one image or on multiple saved images. In various embodiments, a capture time may be determined based on an optimal value of one or more performance metrics which may influence the amount of processing and/or accuracy of performing fill-in processing. The capture time may also be determined based on, for example, detecting one or more gestures within received images, e.g. a person smiling. In the course of receiving live images, one or more indicators may be presented via a display screen to indicate to the user the progress of the one or more performance metrics which may influence when to manually capture an image and/or how to move the camera apparatus to improve the one more performance metrics further. In some example embodiments, one or more messages may be presented to the screen, such as "capture now" or similar. For example, the one or more messages may include improvement suggestions which, based on rules, may influence how the user may move the camera apparatus to improve the one or more performance metrics further, e.g. move left, move up, move backwards. The rules may determine what improvement suggestions to make based on the progress of the performance metrics over a recent plurality of images.

Figure 7:
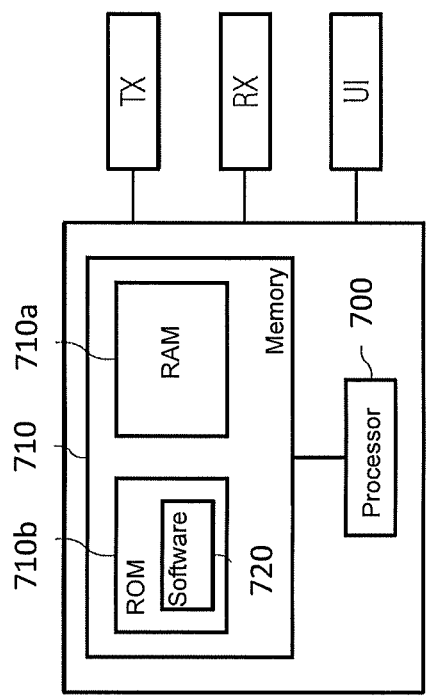
FIG. 7 is a schematic block diagram of an apparatus according to some example embodiments.

FIG. 7 shows an apparatus according to an embodiment, which may comprise the camera apparatus 200 as described herein. The apparatus may be configured to perform the operations described herein, for example operations described with reference to any preceding process. The apparatus comprises at least one processor 700 and at least one memory 710 directly or closely connected to the processor. The memory 710 includes at least one random access memory (RAM) 710a and at least one read-only memory (ROM) 710b. Computer program code (software) 720 is stored in the ROM 710b. The apparatus may be connected to a transmitter (TX) and a receiver (RX). The apparatus may, optionally, be connected with a user interface (UI) for instructing the apparatus and/or for outputting data. The at least one processor 700, with the at least one memory 710 and the computer program code 720 are arranged to cause the apparatus to at least perform at least the method according to any preceding process by executing the computer program code.

Figure 8:
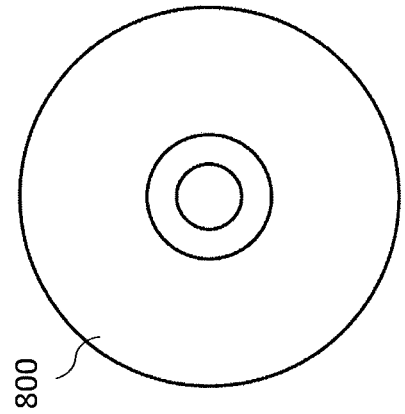
FIG. 8 is a plan view of a non-transitory computer-readable medium as an example carrier of computer-readable code which, when executed, may perform processing operations according to some example embodiments.

FIG. 8 shows a non-transitory media 800 according to some embodiments. The non-transitory media 800 is a computer readable storage medium. It may be e.g. a CD, a DVD, a USB stick, a blue ray disk, etc. The non-transitory media 800 stores computer program code, causing an apparatus to perform the method of any preceding process by the apparatus executing the computer program code.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. Apparatus, comprising:
    at least one processor; and
    at least one memory storing instructions that, when executed with the at least one processor, cause the apparatus to perform:
        receiving an image from a camera sensor;
        receiving selection of one or more target objects appearing in the image;
        tracking the one or more target objects over a plurality of subsequently-received images;
        for respective images of the plurality of subsequently-received images in turn:
            determining one or more performance metric(s) associated with estimated performance of a fill-in processing operation of the one or more tracked target objects, wherein the one or more performance metric(s) are determined based, at least partially, on one or more parameters associated with at least one of:
                a processing time, or
                a power
            associated with the estimated performance of the fill-in processing operation for the one or more tracked target objects; and
            saving the image as an optimized reference image in the event that the respective one or more performance metric(s) indicate an improved performance over that of one or more previously-received images from a time of receiving the selection; and
        performing the fill-in processing operation for a saved optimized reference image of one or more saved optimized reference images, using one or more pixel values of the saved optimized reference image, for output to a display screen.

2. The apparatus of claim 1, wherein the at least one memory stores instructions that, when executed with the at least one processor, cause the apparatus to:
    perform said fill-in processing operation for the saved optimized reference image of the one or more saved optimized reference images, at a time of saving the saved optimized reference image of said one or more saved optimized reference images, for real-time output to the display screen.

3. The apparatus of claim 1, wherein the at least one memory stores instructions that, when executed with the at least one processor, cause the apparatus to:
    perform said fill-in processing operation in respect of only a last-saved optimized reference image based on a capture time.

4. The apparatus of claim 3, wherein the capture time corresponds to a time at which the one or more performance metric(s) for the last-saved optimized reference image meet a predetermined criterion or criteria.

5. The apparatus of claim 3, wherein the capture time corresponds to an end of a predetermined expiry period from when the one or more target objects were selected.

6. The apparatus of claim 3, wherein the capture time corresponds to receipt of a capture input from a user.

7. The apparatus of claim 6, wherein the at least one memory stores instructions that, when executed with the at least one processor, cause the apparatus to perform:
    determining, using an image received at the capture time, the one or more performance metric(s) associated with estimated performance of the fill-in processing operation;
    determining that said one or more performance metric(s) indicate degraded performance relative to a last-saved optimized reference image; and
    performing the fill-in processing operation in respect of the image received at the capture time and the last-saved optimized reference image for preview.

8. The apparatus of claim 1, wherein the at least one memory stores instructions that, when executed with the at least one processor, cause the apparatus to:
    perform indicating in real-time, via a user interface, the one or more performance metric(s) for a currently-displayed one of the subsequently-received images.

9. The apparatus of claim 1, wherein the at least one memory stores instructions that, when executed with the at least one processor, cause the apparatus to:
    indicate in real-time when the one or more performance metric(s) for a last-saved optimized reference image meet a predetermined criterion or criteria.

10. The apparatus of claim 1, wherein the one or more target objects comprise a plurality of target objects, wherein the at least one memory stores instructions that, when executed with the at least one processor, cause the apparatus to:
    estimate the one or more performance metric(s) for respective ones of the plurality of target objects; and
    indicate the respective one or more performance metric(s) for the plurality of target objects.

11. The apparatus of claim 10, wherein the at least one memory stores instructions that, when executed with the at least one processor, cause the apparatus to:
    indicate in real-time a first set of one or more target objects for which the respective one or more performance metric(s) meet a predetermined criterion or criteria and a second set of one or more target objects for which the respective one or more performance metric(s) do not meet the predetermined criterion or criteria.

12. The apparatus of claim 11, wherein the at least one memory stores instructions that, when executed with the at least one processor, cause the apparatus to perform:
    determining that the respective one or more performance metric(s) for the second set of one or more target objects does not indicate an improved performance over a predetermined time period;
    responsive to the determination, providing to a user options of:
        performing the fill-in processing operation in respect of only the first set of one or more target objects; or performing the fill-in operation in respect of the first and second sets of one or more target objects; and performing the fill-in processing operation based on user selection of one of the options.

13. The apparatus of claim 1, wherein the one or more parameters comprise one or more of:

a size of the one or more target objects;

a size of a part of the one or more target objects estimated as difficult to fill-in;

a shape of the one or more target objects;

a position within a frame of the one or more target objects;

a complexity of one or more background regions outside of the one or more target objects; or an estimated accuracy of segmenting the one or more target objects responsive to a user selection.

14. The apparatus of claim 1, comprising a mobile handset or digital camera.

15. A method, comprising:

receiving an image from a camera sensor;

receiving selection of one or more target objects appearing in the image;

tracking the one or more target objects over a plurality of subsequently-received images;

for respective images of the plurality of subsequently-received images in turn:

determining one or more performance metric(s) associated with estimated performance of a fill-in processing operation of the one or more tracked target objects, wherein the one or more performance metric(s) are determined based, at least partially, on one or more parameters associated with at least one of:

a processing time, or a power associated with the estimated performance of the fill-in processing operation for the one or more tracked target objects; and saving the image as an optimized reference image in the event that the respective one or more performance metric(s) indicate an improved performance over that of one or more previously-received images from a time of receiving the selection; and performing the fill-in processing operation for a saved optimized reference image of one or more saved optimized reference images, using one or more pixel values of the saved optimized reference image, for output to a display screen.

16. A non-transitory computer readable medium comprising instructions, when executed by an apparatus, cause the apparatus to perform at least the following:

receiving an image from a camera sensor;

receiving selection of one or more target objects appearing in the image;

tracking the one or more target objects over a plurality of subsequently-received images;

for respective images of the plurality of subsequently-received images in turn:

determining one or more performance metric(s) associated with estimated performance of a fill-in processing operation of the one or more tracked target objects, wherein the one or more performance metric(s) are determined based, at least partially, on one or more parameters associated with at least one of:

a processing time, or a power associated with the estimated performance of the fill-in processing operation for the one or more tracked target objects; and saving the image as an optimized reference image in the event that the respective one or more performance metric(s) indicate an improved performance over that of one or more previously-received images from a time of receiving the selection; and performing the fill-in processing operation for a saved optimized reference image of one or more saved optimized reference images, using one or more pixel values of the saved optimized reference image, for output to a display screen.

17. The method of claim 15, further comprising:

performing said fill-in processing operation for the saved optimized reference image of the one or more saved optimized reference images, at a time of saving the saved optimized reference image of said one or more saved optimized reference images, for real-time output to the display screen.

18. The method of claim 15, further comprising:

performing said fill-in processing operation in respect of only a last-saved optimized reference image based on a capture time.

19. The method of claim 18, wherein the capture time corresponds to a time at which the one or more performance metric(s) for the last-saved optimized reference image meet a predetermined criterion or criteria.

20. The method of claim 18, wherein the capture time corresponds to an end of a predetermined expiry period from when the one or more target objects were selected.

* * * * *